United States Patent
DeLaurentis

(10) Patent No.: US 8,242,949 B2
(45) Date of Patent: Aug. 14, 2012

(54) MULTIPATH SAR IMAGING

(76) Inventor: John M. DeLaurentis, Albuquerque, NM (US)

( * ) Notice: Subject to any disclaimer, the term of this patent is extended or adjusted under 35 U.S.C. 154(b) by 50 days.

(21) Appl. No.: 12/803,579

(22) Filed: Jun. 30, 2010

(65) Prior Publication Data

US 2012/0001795 A1    Jan. 5, 2012

(51) Int. Cl.
*G01S 13/00* (2006.01)
(52) U.S. Cl. .................. 342/25 R; 342/25 A; 342/25 B; 342/25 C; 342/25 D; 342/25 E; 342/25 F
(58) Field of Classification Search ............... 342/25 R, 342/25 A, 25 B, 25 C, 25 D, 25 E, 25 F
See application file for complete search history.

(56) References Cited

U.S. PATENT DOCUMENTS

| | | | | |
|---|---|---|---|---|
| 4,316,191 A * | 2/1982 | Sawatari et al. | ............... | 342/91 |
| 6,384,766 B1 * | 5/2002 | Ulander | ............... | 342/25 R |
| 6,646,593 B1 * | 11/2003 | Garren | ............... | 342/179 |
| 6,772,100 B2 * | 8/2004 | Lipp | ............... | 702/193 |
| 6,812,886 B2 * | 11/2004 | Garren | ............... | 342/179 |
| 7,026,981 B1 * | 4/2006 | Smith, Jr. | ............... | 342/159 |
| 7,161,529 B1 * | 1/2007 | Smith, Jr. | ............... | 342/159 |
| 7,173,562 B2 * | 2/2007 | Garren | ............... | 342/179 |
| 7,259,715 B1 * | 8/2007 | Garren et al. | ............... | 342/179 |
| 7,369,083 B2 * | 5/2008 | Budic | ............... | 342/159 |
| 7,385,553 B1 * | 6/2008 | Garren | ............... | 342/179 |
| 7,456,780 B1 * | 11/2008 | Garren | ............... | 342/25 A |
| 7,515,098 B1 * | 4/2009 | Garren et al. | ............... | 342/179 |
| 7,705,768 B2 * | 4/2010 | Nonaka et al. | ............... | 342/25 R |

OTHER PUBLICATIONS

"Nyquist Frequency", Wikipedia. Mar. 5, 2004. Retrieved using the Way Back Machine at http://web.archive.org/web/20040305134036/http://en.wikipedia.org/wiki/Nyquist_rate on Dec. 16, 2011.*

* cited by examiner

*Primary Examiner* — Jack W Keith
*Assistant Examiner* — Peter Bythrow

(57) ABSTRACT

Disclosed is a method for removing the distortions produced by multipath Synthetic Aperture Radar (SAR) imaging. Conventional SAR systems assume that the returned signal consists of only direct scatterings; in practice however, the returned signal consists of multiple scattering events. Multiple or multipath scattering occurs when part of the surface reflects energy to at least one other part of the surface before the signal is scattered back to the receiver. Multipath scattering distorts the SAR image by superimposing blurring artifacts that diminish the resolution of the radar image. We exploit the phase change introduced by the "half Nyquist" frequency points of Fourier space to remove the effects of multiple scattering. The reflectivity function of the scene is recovered while retaining the resolving power of single scattering SAR.

20 Claims, 5 Drawing Sheets

MULTIPATH SAR IMAGING

BACKGROUND OF THE INVENTION

1. Field of the Invention

This invention involves a process for rendering Synthetic Aperture Radar images. Specifically, the invention provides a method for recovering radar images in the presence of multipath scattering. The process provides radar images without the distorting effects of multiple scatterings while maintaining the resolution of conventional single scattering SAR.

2. Description of the Prior Art

By using radar measurements of the scene taken from various aspect angles, the processed SAR data provides a two dimensional image of the scene over a synthetic aperture instead of a physical aperture. A physical aperture or antenna of the size needed to provide the desired resolution would be impractical for most imaging systems; the synthetic aperture is produced by using different aspect angles. Conventional SAR assumes that the returned signal is produced by single scattering events; the multiple scattering events appear as artifacts superimposed on the image and lead to a loss in resolution.

Jim and Moura in"Time Reversal Target Focusing in Spotlight SAR," 2007 IEEE International Conference on Acoustics, Speech, and Signal Processing, have developed a time reversal SAR algorithm (TR-SAR) for processing phase history in the presence of multipath scattering. This approach requires a two-pass data collection process in which the target is not present in one of the passes. Since the subtraction procedure (Jin et al., "Time Reversal Synthetic Aperture Radar Imaging In Multipath," Forty-First Asilomar Conference on Signals, Systems, and Computers 2007, November 2007, pp. 1812-1816) used in TR-SAR removes only strong reflections from dominant clutter scatterers in the vicinity of the target, the algorithm supplements the TR-SAR process with multi-look averaging to remove additional ghost patterns in the multipath SAR images. For many applications the two-pass system, in which the target is missing in one of the passes, may be impractical to implement. Also, the multi-look averaging procedure may diminish the resolution of the imaging system.

Lipp, in "Multipath Mitigation Filter," U.S. Pat. No. 6,772,100 B2, has developed a method for estimating and correcting the position of an object in the presence of multipath scattering by using a mitigation filter. This approach uses the statistical properties of the background clutter to detect whether a multipath condition exists and uses a bias estimator to correct for an alteration in the object's position. Since this method depends on the statistical properties of the background, the technique may prove to be ineffective for scenes exhibiting statistical behavior different from the statistical model used for the mitigation filter. Also, this approach excludes the effect of the deterministic multipath scattering from other nearby objects and provides no method for correcting these types of errors.

Garren, in "Process for Mapping Multiple-Bounce Ghosting Artifacts from Radar Imaging Data," U.S. Pat. No. 6,646,593 B1, presents a frequency-domain back-projection method for processing an array of multipath SAR images that are measured at different aspect angles. Garren and Greeno, in "Method for Developing and Using an Image Reconstruction Algorithm for Multipath Scattering," U.S. Pat. No. 7,515,098 B1, use this approach to provide the additional information of the particular aspect angles at which the delayed response scattering effects are most important. The drawback to this method for recovering the reflectivity function is that, to provide for the different aspect angles, the radar path may subtend a wider than normal aspect angle. The SAR reflectivity function at large aspect angles can be distorted with respect to the function observed at smaller angles; these distortions may corrupt the reconstruction of the reflectivity function. More precisely, the imaging process illustrated in Garren gathers information over aspect angles of 0.2 rad or 11.5 degrees; whereas, the aspect angles for SAR are typically less than or equal to 0.1 rad or 5.73 degrees (this approximate bound is based on a center frequency of 30 GHz and a resolution of approximately 6 inches; see Jakowatz et al., "Spotlight-Mode Synthetic Aperture Radar: A Signal Processing Approach," Kluwer Academic Publishers, 1996). SAR reflectivity is a function of the unit normal to the reflecting surface so that small aspect angles, $\theta$, are essential for ensuring that the reflectivity function is independent of the azimuth angle (Harger, "Synthetic Aperture Radar Systems *Theory and Design*," Academic Press, 1970).

Since the reflectivity $f(x, y, \gamma)$, used in Garrett, is assumed to be invariant over a larger than normal extent of measurement angles $\theta$, the function $f$ may actually depend on $\theta$. In turn the variation over $\theta$ could introduce distortions in the recovered back-projected SAR image.

SUMMARY OF THE INVENTION

The present invention consists of a SAR multipath removal process and an image reconstructed from the backscattered data of a radar illuminated scene where the data is comprised of single and multipath scattering. The single scattering assumption neglects the case where the radar wave reflects off multiple parts of the scene before returning to the receiver. In particular, conventional SAR systems would have difficulty determining if three returns represented single scattering events from three different reflectors or direct scattering from two reflectors and a double scattering event. This problem is compounded by the presence of several reflectors, within the scene, all combining to produce several multipath scatterings.

The method for solving this problem, described here, assumes that the radar is used in spotlight mode and that the objects in the scattering region are stationary. Although the method can be extended to higher order scatterings, the discussion presented here focuses on double scattering events; for most applications the higher order scatterings are negligible. The transmitter and receiver are assumed to be co-located, that is, the signal is received at the same location at which the transmitted signal originates; this approach, however, can be extended to the bistatic case by a similar analysis. It should be noted that this method requires only a single phase center. One skilled in the art could also extend this method to conventional stereo SAR, strip-map mode SAR and coherent change detection.

The key idea in this method is the construction of a secondary multipath SAR image in which the double scattering term has a different phase from the corresponding term in the primary multipath SAR image. The primary image consists of data that has been recorded by sampling the signal at the Nyquist rate; the secondary image consists of samples displaced, in Fourier space, by half a "Nyquist" step from each of the samples of the primary image. The secondary image samples are referred to here as the 'half Nyquist' frequency samples. The double scattering term in the secondary image includes a multiplicative phase factor that differs sufficiently from the corresponding term in the primary image allowing us to algebraically solve for the single scattering term; that is, the double scattering terms can be used to cancel one another. The cancellation of the double scattering terms is analogous to the phase contrast techniques used in optics to enhance image contrast by introducing a phase change; except that in this case, we use the phase shift to remove a scattering term. This SAR multipath image restoration technique requires only that we sample at twice the Nyquist rate in range.

Our approach corrects for multiple scatterings without diminishing resolution and requires only a single collection pass for SAR image formation. Our method depends on neither the statistical properties of the background nor the statistical model for a mitigation filter. The method presented here deterministically corrects for the effect of multipath scattering; including the effect of multiple scatterings from nearby objects. Our approach requires only a small azimuth angle and only that we sample at double the Nyquist range rate.

The primary object of the present invention is to provide a practical method for removing the distortions, due to multipath scattering, in SAR images. Another object of this invention is to present a method that can be used in a wide range of SAR applications. These and other objects should become apparent after reading the accompanying description, drawings and claims.

DETAILED DESCRIPTION OF THE INVENTION

Figure 1:
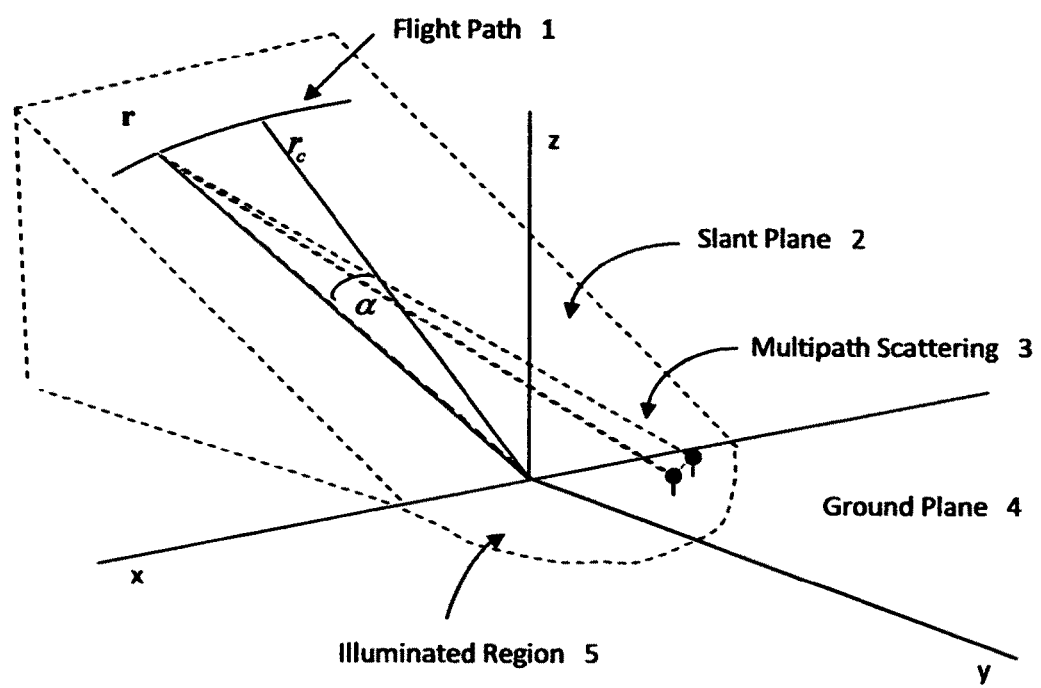
FIG. 1 illustrates the SAR geometry and depicts a double scattering event.

The best mode contemplated by the inventor, for removing the effects of multipath scattering, implements the SAR imaging process in spotlight mode and samples the signal at twice the Nyquist rate in range. The SAR geometry, depicted in FIG. 1, is described in terms of the slant plane parameters with, r=radar location along the flight path 1,
α=azimuth angle,
2a=diameter of the illuminated region's projection onto the slant plane,
$r_0$=nominal radar range
$\omega_0$=radar center frequency
$k_0 = \omega_0/c$=center spatial frequency
$\gamma_0$=center chirp rate (angle α=0)
$B = \gamma_0 \tau/(2\pi)$=bandwidth τ=pulse duration
$\beta = B\tau = \gamma_0 \tau^2/(2\pi)$=time-bandwidth product
and c equals the speed of light in a vacuum. (Here and in the following, a bold faced symbol denotes a vector.) The "slant" plane 2 in FIG. 1 may be tilted and slanted with respect to the ground plane 4. The planar SAR reflectivity function arises from the "layover" of elevated targets onto the slant plane near the point on the plane closest to the reflector. The schematic of two approximate point reflectors, given by 3 in FIG. 1, depicts direct scattering from the two reflectors and a double scattering event.

Figure 2:
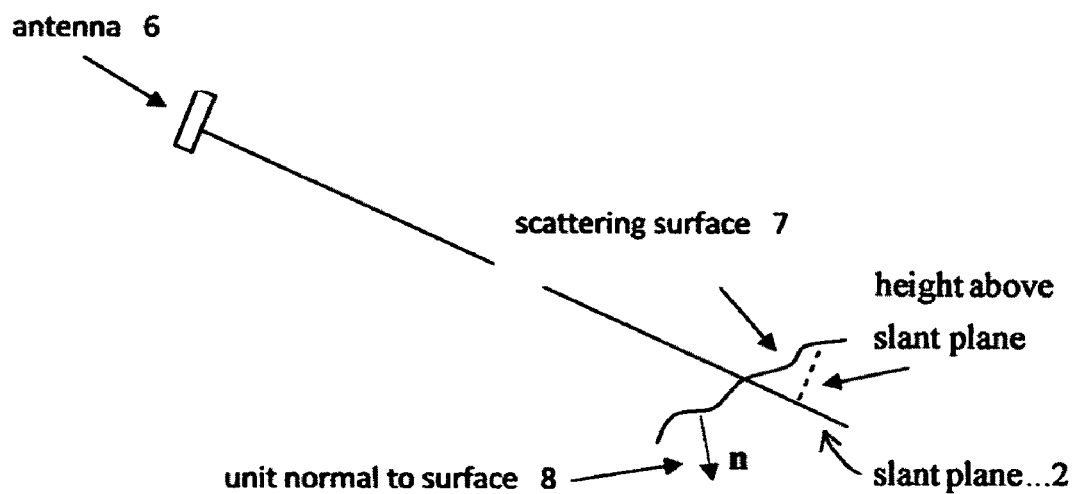
FIG. 2 illustrates a cross section of the antenna and the scattering surface used in the Stratton-Chu scattering integral representation.

The basic idea in this method is to construct two multipath SAR images, a primary and secondary image, such that the phase of the double scattering term differs in the two images. The secondary image consists of samples displaced, in Fourier space, by half a "Nyquist" step from each of the samples of the primary image. The change in phase of the double scattering terms allows us to remove these terms; the appearance of the different phase factor follows from the Stratton-Chu integral operator representation of the scattered field. The schematic in FIG. 2 illustrates a cross sectional view of the slant plane 2 and the scattering surface 7, where the transmitter or receiver may consist of a microstrip antenna 6 or a reflector antenna (see FIG. 2). The scattering from the rest of the radar platform, say the radome, is assumed to be negligible.

Figure 3:
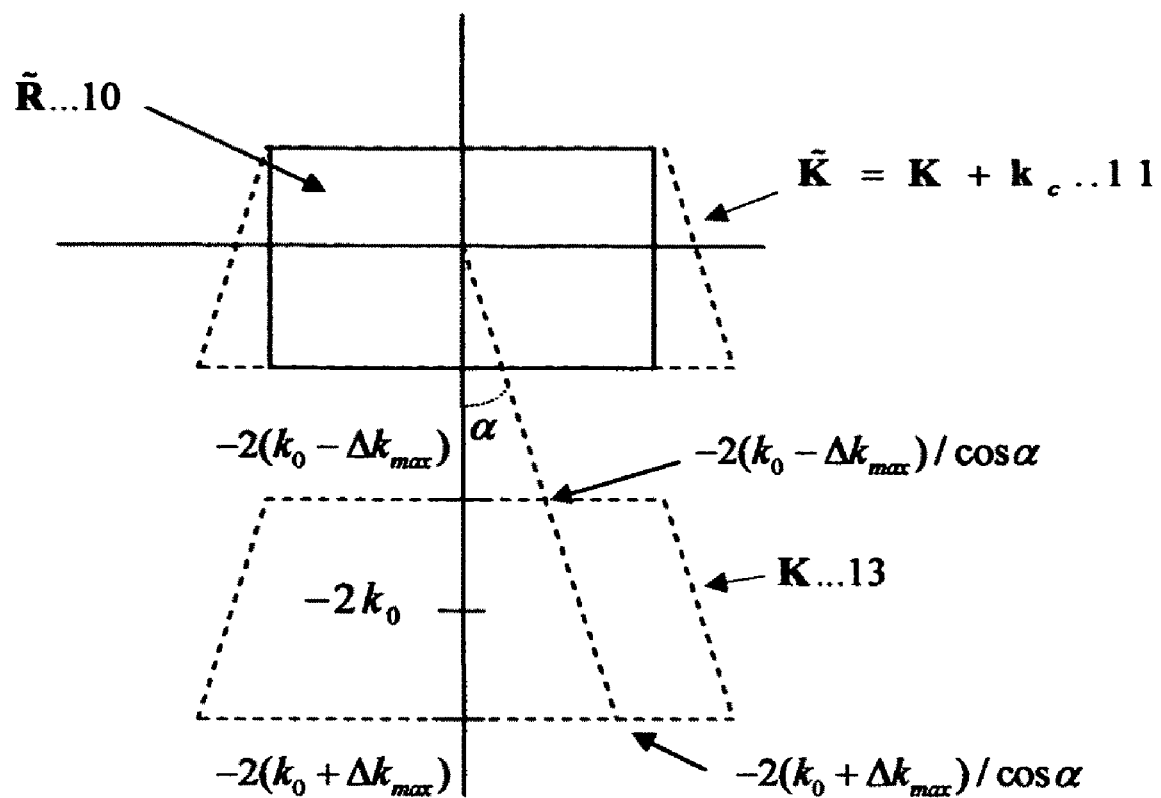
FIG. 3 illustrates the conventional and translated Fourier space apertures; the choice for the aperture location partially determines the phase change in the double scattering term.

To provide an overview of the multipath imaging process, we outline the steps involved in deriving the image correction procedure. Setting $E_{rec}(r,t)$ equal to the recorded signal, taking the Fourier transform $E_{rec}(r,t)$, stripped of its carrier signal $e^{-i\phi_\alpha(t-\tau/2)}$ and multiplying by the phase factor $e^{2ik_0 r_\alpha}$, we obtain the scattering expression, $$\tilde{E}_{sc}(r, \omega/c) = e^{2ik_0 r_\alpha} \int_0^\infty e^{i\phi_\alpha(t-\tau/2)} E_{rec}(r,t) e^{-i\omega t} dt, \quad (1)$$

where $\phi_\alpha(t) = \omega_\alpha t + \gamma_\alpha t^2/2$, τ equals the duration of the pulse, $\omega_\alpha = \omega_0/\cos\alpha$, $\gamma_\alpha = \gamma_0/\cos\alpha$, $r_\alpha = |r| \cos\alpha$ and $\tau_a = 2a/c$, see FIG. 1. By virtue of the Stratton-Chu integral representation and a paraxial approximation for the far field, we show that the scattering term, $\tilde{E}_{sc}$, satisfies $$\tilde{E}_{sc}(r, k) = (i\eta)^2 e^{-ikc\tau_a} A_{so} \hat{\zeta}_\alpha(k) \mathcal{F}^{-1}\{\sigma_{cr}\}(\tilde{k}) + \quad (2)$$
$$i\pi(i\eta)^2 \frac{e^{-ik(r_0 + c\tau_a) + 2ik_0 r_0}}{r_0} A_{so} \hat{\zeta}_\alpha(k) \left[ \mathcal{F}^{-1}\{\sigma_{cr}\}\left(\frac{\tilde{k} + k_c}{2}\right)\right]^2,$$

where $k_c = 2(0, k_0)$, $k = |\tilde{k} - k_c|/2$, $\tilde{k} \in \tilde{K}$, $\tilde{K}$ denotes the Fourier space aperture, $\mathcal{F}^{-1}\{\sigma_{cr}\}(\tilde{k})$ is the inverse Fourier transform (with respect to the space variables) of the SAR reflectivity function $\sigma_{cr}$, $\tilde{\eta} = k e^{2ik_0 r_\alpha}/(4\pi r_0)$ and $A_{so}$ is a known constant. (For the non co-located receiver and transmitter the Fourier transform variable is given in terms of an average of the locations of the receiver and transmitter.) Here, the function, $\hat{\zeta}_{60}(k) = \int \zeta_\alpha(s/c) e^{-iks} ds$, is the Fourier transform of the linear FM chirp, $\zeta_\alpha(t) = \Re\{e^{i\phi_\alpha(t-\tau/2)}\}\text{rect}[(t-\tau/2)/\tau]$. We show that there exists $\Delta k_{max}$ such that $|k_\alpha \hat{\zeta}(k)| \geq 1$ for all $k = (k_0 - \Delta k)/\cos\alpha$ provided $|\Delta k| \leq \Delta k_{max}$, $|\alpha| \leq \alpha_{max}$ and $$k_\alpha = \frac{k_0}{\cos\alpha};$$

that is, for the aperture K depicted by 13 in FIG. 3, we have $|k_\alpha \hat{\zeta}_\alpha(k)| \geq 1$ for all $k \in K = \{k : k = 2kr/|r| = 2((k_0 - \Delta k) \tan\alpha, -(k_0 - \Delta k)), |\alpha| \leq \alpha_{max}$ and $|\Delta k| \leq \Delta k_{max}\}$ where $k = (k_0 - \Delta k)/\cos\alpha$ and $r = (r \sin\alpha, -r \cos\alpha)$ (here, $\alpha_{max}$ denotes the maximum azimuth angle). The aperture K translated to the origin is given by 11 where $\tilde{K} = \{k : \tilde{k} = 2((k_0 - \Delta k) \tan\alpha, \Delta k), |\alpha| \leq \alpha_{max}$ and $|\Delta k| \leq \Delta k_{max}\}$ or $\tilde{K} = K + k_c$, for $k_c = 2(0, k_0)$. The introduction of the phase factor $e^{2ik_0 r_\alpha}$ translates the conventional Fourier space aperture, K, to the aperture $\tilde{K}$, where, $\tilde{R}$ denoted by 10 in FIG. 3, is the largest rectangle contained in $\tilde{K}$.

The leading term in the scattering expression, Eq. (2), is essentially the Fourier transform of the reflectivity, $\sigma_{cr}$. It follows that if we set $$\tilde{U}_{sc}(\tilde{k}) = \frac{k_0 k_\alpha B_\Delta}{k^2} \frac{e^{-i\varphi}}{k_\alpha \hat{\xi}_\alpha(k) A_{tr}} \tilde{E}_{sc}(r, k),$$

where $\phi = 4k_0 r_\alpha - kc\tau_\alpha$, $A_{tr}$, is a normalization constant, $B_\Delta = (1-\Delta k_{max}/k_0)^2$ and $A_0 = A_{so} B_\Delta / A_{tr}$, we obtain an expression in which the leading term is proportional to the Fourier transform of $\sigma_{cr}$. Although the data is usually collected on a trapezoidal raster, we simplify the presentation by assuming that the data has been interpolated or resampled to produce values on a rectangular grid (a modification of the following analysis can also be applied to the original trapezoidal grid). Denoting by $\tilde{U}_{sc,\chi}(\tilde{k}_\alpha) = \tilde{U}_{sc}(\tilde{k}_\alpha + \chi k_{1/2})$ the values at the grid points on the rectangular grid contained in $\tilde{R}$ or 10, where $\chi = 0$ or 1, $\tilde{k}_\alpha = (n_x, n_y)\kappa$, $k_{1/2} = (0, \frac{1}{2})\kappa$ and $\kappa$ denotes the sampling frequency, we obtain from Eq. (2), $$\tilde{U}_{sc,\chi}(\tilde{k}_n) \approx \frac{k_0 A_0}{4 r_0^2} \mathcal{F}^{-1}\{\sigma_{cr}\}(\tilde{k}_n + \chi k_{1/2}) + \quad (3)$$
$$i\pi \frac{k_0 A_0 e^{i[k_0 r_0 + (k_{ny} + \chi \kappa/2) r_0]}}{4 r_0^3} \mathcal{F}^{-1}\{(k_0 + i\partial/(\partial s_y))\tilde{\sigma}_{cr} * \tilde{\sigma}_{cr}\}(\tilde{k} + \chi k_{1/2}).$$

Since the higher order scatterings are negligible for most applications, we have truncated the expansion at the double scattering term (at the end of this section we indicate a way to extend this method to remove the higher order scattering terms).

One embodiment of this invention removes the multipath distortions by operating on $\tilde{U}_{sc,\chi}$ so that the leading term can be used to remove the double scattering term. A similar method can be implemented in the space domain by operating on the appropriate autocorrelation and using the result to remove the double scattering term.

A more seamless approach exploits the phase difference, between the half and whole frequency terms, to cancel the multiple scattering terms. Applying the discrete Fourier transform to Eq. (3) where $\tilde{\sigma}_{cr}(s) = e^{2ik_0 s_y} \sigma_{cr}(2s)$ combined with the shift property of Fourier transforms, we have, $$U_{sc,\chi}(s) \equiv \mathcal{F}_D\{\tilde{U}_{sc,\chi}\}(s) \approx \quad (4)$$
$$\frac{k_0 A_0}{4 r_0^2} e^{i\frac{\chi}{2} \kappa s_y} S_D * \sigma_{cr}(s) + i \frac{k_0 A_0 e^{ix\theta_\xi}}{4 r_0^3} e^{i\frac{\chi}{2} \kappa s_y} S_D * \{T[\tilde{\sigma}_{cr} * \tilde{\sigma}_{cr}]\}(s)$$

where $\mathcal{F}_D\{\tilde{U}_{sc}\}$ denotes the discrete transform, $S_D(s)$ equals the product of "discrete sinc" functions and $$T[\tilde{\sigma}_{cr} * \tilde{\sigma}_{cr}](s) = \left(k_0 + i\frac{\partial}{\partial s_y}\right) \tilde{\sigma}_{cr} * \tilde{\sigma}_{cr}(s_x, s_y + s_\xi)$$

for some translation $s_\xi$. Here, the sampling frequency $\kappa$ is given by, $$\kappa = \frac{\pi}{a + \Delta a}$$

where if $\lfloor r_0/2a \rfloor$ is even, with $\lfloor x \rfloor$ equal to the greatest integer less than or equal to x, then $$\Delta a = \xi \frac{a^2}{r_0} \text{ for } \xi \approx \frac{2}{1 - 2\alpha/r_0}$$

if $\lfloor r_0/2a \rfloor$ is odd; set $\Delta a = 0$. The appearance of the phase factor $e^{i\chi\pi}$, in the second term of Eq. (4), is essential for the multipath imaging procedure; that is, adding $\tilde{U}_{sc,0}$ to $$e^{-i\frac{\kappa}{2} s_y} U_{sc,1}$$

and dividing by 2, we arrive at the desired result, $$\frac{k_0 A_0}{4 r_0^2} V_{sc}(s) \equiv \frac{U_{sc,0}(s) + e^{-i\frac{\kappa}{2} s_y} U_{sc,1}(s)}{2} \approx \frac{k_0 A_0}{4 r_0^2} S_D * \sigma_{cr}(s). \quad (5)$$

The frequency $\kappa$, defined by $\kappa = \pi/(a+\Delta a)$ where $\Delta a \geq 0$, may be slightly smaller than the Nyquist frequency $\pi/a$.

By making use of a fractional frequency other the half-frequency, we would obtain another method for removing the higher order scattering term. In this embodiment of the invention the Nyquist frequency $\pi/a$ could be used; however, this approach may require the use of non-uniform sampling. Other embodiments, using this strategy, would share essentially the same underlying feature, namely, the use of a change in phase to eliminate the higher order scattering terms.

We note that a different phase factor in Eq. (1) could be used without affecting the multipath removal process. We recall that the phase factor $e^{2ik_0 r_\alpha}$, introduced in Eq. (1), translates the keystone domain to the origin; but, since this factor does not affect the phase term $e^{i\chi\pi}$, we may use a different factor and still be able to correct for multipath scattering. This phase factor is used because the centered domain captures, for most applications, the dominant Fourier coefficients of the reflectivity function.

Although the multiple scattering series has been truncated after the double scattering term, it is possible to include more terms. For the paraxial approximation used in the preceding; the higher order terms may be approximately equal to the error; however, the inclusion of more terms in the paraxial approximation would permit the use of more scattering terms. In turn, by including more samples, a third image could be introduced to extend the multipath approach to remove the triple scattering terms. Higher order terms could be removed in a similar manner.

Conventional SAR processing approximates the spherically curved wavefront of the radar beam by a planar surface; this introduces errors that become increasingly more apparent as the radar range diminishes. We can overcome this difficulty by approximating the spherically curved wavefront with a quadratic surface and using the derivative formula for Fourier transforms to remove the quadratic term distortions in the reflectivity function. It follows that the method presented here is valid for both the intermediate and far fields.

The resolution, after removing the multiple scattering terms, can be shown to achieve the resolving power given by the Rayleigh criterion for single scattering SAR. Specifically, it can be shown that, for a linear FM chirp, the range and cross-range resolution, $\rho_x$ and $\rho_y$, approximately equal the range and cross-range resolution given by the Rayleigh criterion for the slant plane, namely, $\rho_x = \lambda/(4\alpha_{max})$ where $\omega_0/c = 2\pi/\lambda$, $\alpha_{max}$ is the maximum azimuth angle and $\rho_y = c/[(1-\tau_\alpha/\tau)2B] \approx C/(2B)$ where $B = \gamma_0 \tau/(2\pi)$.

To test the method, we simulate the Fourier domain field component, in the presence of multipath scattering, by using an iterated Stratton-Chu integral representation of the scattered signal, combined with the assumption that the height, above the slant plane, is negligible. For our test case we set: $\tau=10^{-4}$(sec), $r_0=1.505\times10^4$ (m)$\approx$15 (km), a=25 (m), $\omega_0=3\times10^{10}$ (rad/sec), $\gamma_0=6\times10^{13}$ (rad/sec$^2$) and we assume a 30 (dB) signal-to-noise ratio. Also, we assume that $\rho_x=\rho_y$, so that the cross-range and range resolution are given by $$\rho_y = \frac{\pi}{2\Delta k_{max}} \approx \frac{\pi}{2[\gamma_0\tau/(2c)]} \approx .157 \text{ (m)}.$$

We note that the maximum azimuth angle $\alpha_{max}$ given by $$\alpha_{max} = \frac{\lambda}{4\rho_x} \approx .1 \text{ (rad)}$$

or approximately 5.73 degrees.

Figure 4:
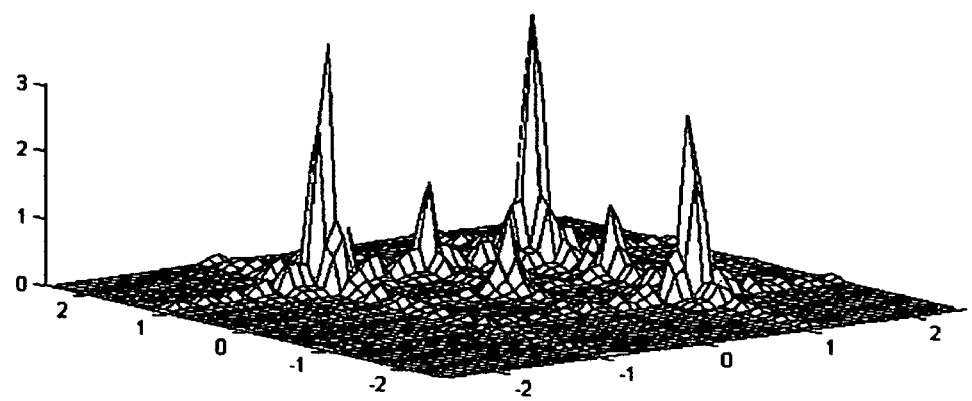
FIG. 4 illustrates the effect multipath scattering has on SAR image formation; the three larger peaks depict direct scattering and the three smaller peaks depict double scattering events.
Figure 5:
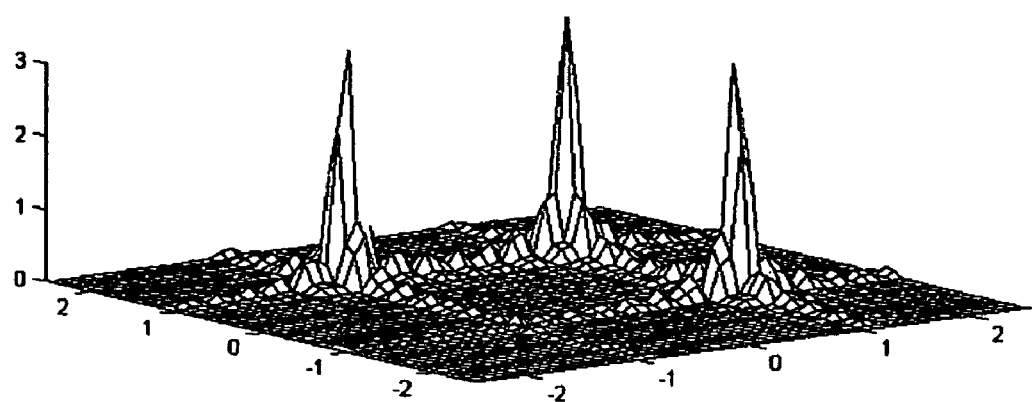
FIG. 5 illustrates the resulting surface after the double scattering terms have been removed.

Three approximate "point" reflectors, placed near the center of the scene, were used to simulate multipath scattering. In FIG. 4, the three large peaks depict the direct scattering response from the point reflectors, and the three smaller peaks depict the double scattering events. To highlight the multiple scatterings, we have chosen to represent the image as a surface instead of the usual gray-scale image. The surface, in FIG. 5, clearly shows that the double scattering terms have been successfully removed.

Our multipath imaging procedure removes the distortions due to multiple scatterings in roughly two steps: first, a Fourier transform technique is applied to the time data and second, the double scattering term is algebraically removed by exploiting the phase shift that arises in data recorded at the half frequency points. The simulation demonstrates the efficacy of this approach. A similar method could be used to remove higher order scatterings. This procedure could be implemented as a preprocessing step for other SAR imaging techniques including conventional stereo SAR, strip map mode SAR and coherent change detection.

What is claimed is:

1. A Synthetic Aperture Radar process comprising the steps of:
 a process for collecting, from a radar illuminated surface, a data set,
 a process for recovering a scene from the backscattered data,
wherein the data is comprised of single and multipath scattering events.

2. The process according to claim 1 wherein distortions due to multiple scatterings are removed.

3. The process according to claim 1 wherein distortions due to double scattering events are removed.

4. The process according to claim 1 wherein the scattering data is collected in range at twice the Nyquist rate.

5. The process according to claim 1 wherein the scattering data is collected in range at a rate higher than the Nyquist rate.

6. The process according to claim 1 wherein the scattering data is collected in range at a rate different from twice the Nyquist rate.

7. The process according to claim 1 wherein the scattering data is collected using a co-located receiver and transmitter.

8. The process according to claim 1 wherein the scattering data is collected using a non co-located receiver and transmitter.

9. The process according to claim 1 wherein the data is collected in the intermediate field.

10. The process according to claim 1 wherein the data is collected in the far field.

11. The process according to claim 1 wherein the data is collected over small aspect angles.

12. A Synthetic Aperture Radar image comprising:
 a means for collecting from a radar illuminated surface a data set;
 a means for recovering a scene from the backscattered data set;
wherein the data is comprised of single and multipath scattering events.

13. A Synthetic Aperture Radar image according to claim 12, wherein distortions due to multiple scatterings are removed.

14. A Synthetic Aperture Radar image according to claim 12 wherein distortions due to double scattering events are removed.

15. A Synthetic Aperture Radar image according to claim 12 wherein the scattering data is collected in range at twice the Nyquist rate.

16. A Synthetic Aperture Radar image according to claim 12 wherein the scattering data is collected in range at a rate higher than the Nyquist rate.

17. A Synthetic Aperture Radar image according to claim 12 wherein the scattering data is collected in range at a rate different from twice the Nyquist rate.

18. A Synthetic Aperture Radar image according to claim 12 wherein the scattering data is collected using a co-located or a non co-located receiver and transmitter.

19. A Synthetic Aperture Radar image according to claim 12 wherein the data is collected in the intermediate field or in the far field.

20. A Synthetic Aperture Radar image according to claim 12 wherein the data is collected over small aspect angles.

* * * * *